Dec. 4, 1923.                          1,476,024
W. VAN E. THOMPSON
HOSE CLAMP
Filed Jan. 17, 1921
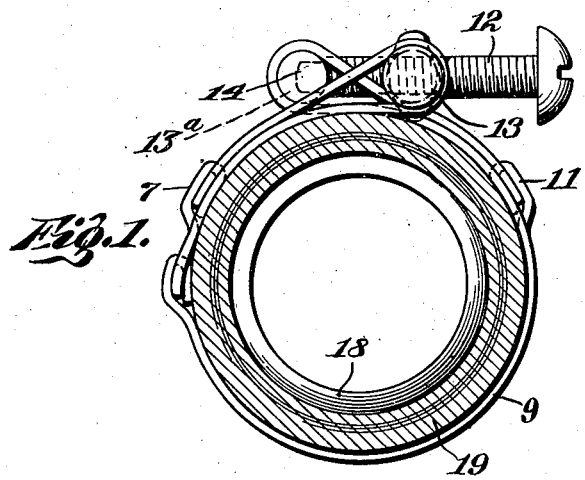
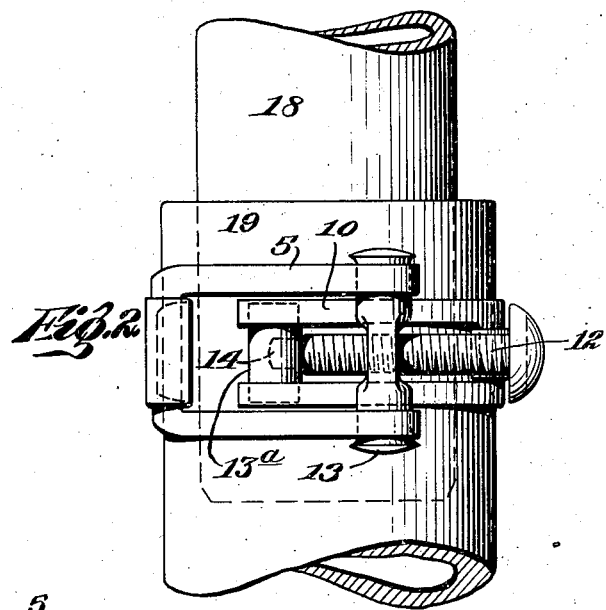
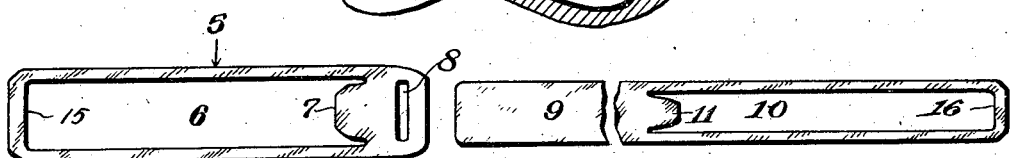
Inventor
Walter Van E. Thompson
by D. Durpham
Atty.

Patented Dec. 4, 1923.

1,476,024

UNITED STATES PATENT OFFICE.

WALTER VAN E. THOMPSON, OF LOS ANGELES, CALIFORNIA.

HOSE CLAMP.

Application filed January 17, 1921. Serial No. 437,652.

*To all whom it may concern:*

Be it known that I, WALTER VAN E. THOMPSON, a citizen of the United States, residing at the city of Los Angeles, county of Los Angeles, State of California, have invented new and useful Improvements in Hose Clamps, of which the following is a specification.

In the drawings forming a part of this application Fig. 1 is an end view of a piece of hose with a fragment of a coupling member held therein by my improved clamp. Fig. 2 is a top plan view of Fig. 1. Fig. 3 is a plan of a portion of the clamp.

Referring to the drawings I take a short strip of sheet metal 5 and cut out the central portion to leave an elongated aperture 6 therein having a tongue 7 projecting thereinto. Near tongue 7 I cut a narrow transverse aperture 8 therein. For distinction I will call this part the head. I take another and narrower piece of sheet metal 9 and in one end I cut an elongated aperture 10 therein having a tongue 11 projecting thereinto. For distinction I will call this part the body and the end having aperture 10 the tail. A steel rod 13 of a length equal to the width of the head has the central portion flattened and pierced and the hole therethrough is interiorly threaded for the reception of the threaded bolt 12. Another steel rod 13ª of a length equal to the width of the tail and having a pocket 14 shown in dotted lines in Fig. 2 for the reception of the end of bolt 12 when the parts are assembled for use finishes the parts which comprise the clamp. The head is bent around rod 13 and tongue 7 is raised so as to slip the outer end 15 under the tongue and the end is secured to the other end by passing tongue 7 through aperture 6 and bending the tongue back and down upon end 15. The tail is bent around rod 13ª and tongue 11 is raised so as to slip end 16 under the tongue and the end is secured to the other part by passing tongue 11 through aperture 10 and bending the tongue back and down upon end 16. The other end of the body is then passed through aperture 8 and bent back upon itself thereby completing the clamp. After coupling member 18 is positioned in the end of hose 19 the band is placed around the hose. The tail is passed through the head and the end of bolt 12 is placed in pocket 14 and with a screw driver bolt 12 is rotated until the clamp is tight on the hose. The head and body could be made integral and aperture 8 omitted but I prefer to make them of separate parts as by so doing less metal is wasted and a clamp for a larger size of hose can be used on a smaller size by running the end of the body farther through aperture 8.

Having described my invention I claim:

A hose clamp comprising a strip of sheet metal having a longitudinal aperture therein and a tongue projecting into the aperture and a transverse aperture near the tongue; a pierced rod having a transverse threaded hole therein, said strip being bent around said rod and having the ends secured together by having the tongue bent around the end; a second and longer and narrower strip of sheet metal having a longitudinal aperture in one end thereof and a tongue projecting into the aperture, said last strip being of a width to pass through the transverse aperture in the first strip; a second rod having a pocket in one side thereof, said apertured end of said last strip being bent around said last rod and having the end secured to the other part by having the tongue bent around the end, the unapertured end being secured to the first strip by being passed through the transverse aperture and bent around; and a threaded bolt passing through said first rod and having one end adapted to pass into the pocket of the second rod.

In witness that I claim the foregoing I have hereunto subscribed my name this 11th day of January, 1921.

WALTER VAN E. THOMPSON.